US010759406B2

(12) United States Patent
Motegi

(10) Patent No.: US 10,759,406 B2
(45) Date of Patent: Sep. 1, 2020

(54) RESERVOIR TANK AND VEHICLE BRAKE APPARATUS

(71) Applicant: VEONEER NISSIN BRAKE SYSTEMS JAPAN CO., LTD., Yokohama-shi, Kanagawa (JP)

(72) Inventor: Satoru Motegi, Yokohama (JP)

(73) Assignee: Veoneer Nissin Brake Systems Japan, Co., Ltd., Kanagawa (JP)

( * ) Notice: Subject to any disclaimer, the term of this patent is extended or adjusted under 35 U.S.C. 154(b) by 0 days.

(21) Appl. No.: 16/225,132

(22) Filed: Dec. 19, 2018

(65) Prior Publication Data
US 2019/0184956 A1    Jun. 20, 2019

(30) Foreign Application Priority Data
Dec. 19, 2017   (JP) ................................ 2017-242476

(51) Int. Cl.
| | |
|---|---|
| *B60T 11/22* | (2006.01) |
| *B60T 17/06* | (2006.01) |
| *G01F 23/76* | (2006.01) |
| *G01F 23/56* | (2006.01) |
| *B60T 17/22* | (2006.01) |
| *G01F 23/74* | (2006.01) |
| *B60T 11/26* | (2006.01) |
| *G01F 23/72* | (2006.01) |
| *G01F 23/62* | (2006.01) |

(52) U.S. Cl.
CPC ............... *B60T 11/22* (2013.01); *B60T 11/26* (2013.01); *B60T 17/06* (2013.01); *B60T 17/225* (2013.01); *G01F 23/56* (2013.01); *G01F 23/62* (2013.01); *G01F 23/72* (2013.01); *G01F 23/74* (2013.01); *G01F 23/76* (2013.01); *Y10T 137/8342* (2015.04)

(58) Field of Classification Search
CPC .......... G01F 23/74; G01F 23/72; G01F 23/62; Y10T 137/8342; B60T 11/26; B60T 17/06; B60T 17/225
See application file for complete search history.

(56) References Cited

U.S. PATENT DOCUMENTS

| | | | | |
|---|---|---|---|---|
| 5,016,442 A | * | 5/1991 | Zander | B60T 11/22 340/452 |
| 2002/0005041 A1 | * | 1/2002 | Shinohara | B60T 11/22 60/585 |
| 2016/0251006 A1 | * | 9/2016 | Koshimizu | B60T 11/22 206/459.1 |

FOREIGN PATENT DOCUMENTS

JP    2002-67923 A    3/2002

* cited by examiner

*Primary Examiner* — Atif H Chaudry
(74) *Attorney, Agent, or Firm* — Carrier Blackman & Associates, P.C.; Joseph P. Carrier; Jefffrey T. Gedeon

(57) ABSTRACT

A reservoir tank includes a reservoir body defining a storage chamber for an operating fluid; and a float guide in the storage chamber. The float guide forms a float chamber on the inner side. The reservoir tank further includes a fluid level detection device that has a float moving up and down in the float chamber in accordance with fluctuations of a fluid level, and has a detector detecting when the float is below predetermined position. The reservoir tank is provided with a slit in the float guide. The slit is in communication with the storage chamber and the float chamber. An operating fluid passage is provided on an inner face of the float guide which is continuous with the slit, which is in communication with the slit and the float chamber.

13 Claims, 13 Drawing Sheets

RESERVOIR TANK AND VEHICLE BRAKE APPARATUS

CROSS-REFERENCE TO RELATED APPLICATIONS

This application claims the benefit and priority of Japanese Patent Application JP 2017-242476, filed Dec. 19, 2017. The entire disclosure of the above application is incorporated herein by reference.

TECHNICAL FIELD

The present invention pertains to a reservoir tank and to a brake device for a vehicle.

BACKGROUND

Conventionally, a reservoir tank that is used in a brake device for a vehicle, provided with a master cylinder device for the vehicle and with a fluid pressure control device for the vehicle, is widely known. One example is shown in Japanese Unexamined Patent Application Publication No. 2002-67923.

In the reservoir tank of Japanese Unexamined Patent Application Publication No. 2002-67923, a float guide that forms a float chamber in a reservoir body is formed higher than in conventional approaches. According to the reservoir tank of this reference, even when the reservoir tank is in a forward-inclined orientation during braking of the vehicle, the required amount of fluid in the float chamber is secured, and the fluid level height in the float chamber is maintained.

A slit is formed in the float guide to prevent malfunction of a fluid level detection device. The slit is in communication with the float chamber and a storage chamber on the outer side, and functions as a flow channel for an operating fluid between the float chamber and the storage chamber.

Technical Problem

However, in the reservoir tank of Japanese Unexamined Patent Application Publication No. 2002-67923, the slit is formed in a portion that is a back end part of the float guide in the depth direction. Therefore, when the float has tilted to the rear side, there is a risk that the float may block the slit and affect the passage of the operating fluid. As a result, there has been a possibility that temporary fluctuations may occur in the characteristics of the fluid level detection function of the reservoir tank.

SUMMARY

An object of the present invention is to provide a reservoir tank and a brake device for a vehicle, which allow for the passage of an operating fluid in the float chamber and for the storage chamber to be secured, even when the float has tilted to the slit side, and which suitably prevent the occurrence of fluctuations in the performance of the fluid level detection function of the reservoir tank.

Solution to Problem

A reservoir tank of the present invention has been proposed in order to solve this problem. The reservoir tank is provided with a reservoir body defining a storage chamber for an operating fluid; and a float guide in the storage chamber. The float guide forms a float chamber on an inner side. The reservoir tank is also provided with a fluid level detection device having a float moving up and down in the float chamber on the inner side of the float guide in accordance with fluctuations of a fluid level, and having a detector detecting a position of the float. The reservoir tank is further provided with a slit in the float guide that is in communication with the storage chamber and the float chamber; and an operating fluid passage provided on an inner face of the float guide, that is continuous with the slit and is in communication with the slit and the float chamber.

According to the reservoir tank, in the float guide, even if, hypothetically, the slit were to be blocked by the float due to tilting of the float toward the slit side, the float chamber and the storage chamber would be in communication through the operating fluid passage, which is continuous with the slit, and passage of the operating fluid would be secured. Accordingly, the fluid level of the operating fluid in the float chamber is suitable, which enables the occurrence of fluctuations in the performance of the fluid level detection function to be advantageously prevented.

In addition, the slit may be provided on an upper side of the float guide, and the operating fluid passage may be formed in a linear shape extending downward from a lower end of the slit. According to this configuration, the slit and the operating fluid passage may be formed integrally. Accordingly, a reservoir tank is obtained that is superior in molding characteristics and in production characteristics.

Here, the upper side is a portion positioned on an engine cover side of a vehicle, when mounted in a vehicle.

In addition, the slit may be formed from an upper edge part of the float guide toward a lower side in an axial direction of the float guide, and a lower end position of the slit may correspond to a fluid level position at a minimum level of a suitable storage range of an operating fluid. According to this configuration, in comparison to a situation where the slit is formed as far as a bottom face of the float guide, the amount of operating fluid moving from the float chamber to the storage chamber may be suppressed, and the amount of operating fluid stored in the storage chamber may be secured. Accordingly, the fluid level of the operating fluid in the float chamber is suitable, which enables the occurrence of fluctuations in the performance of the fluid level detection function to be advantageously prevented.

In addition, the operating fluid passage may extend to a region below the float, in a state where the float has approached the fluid level position at the minimum level of the suitable storage range of the operating fluid. According to this configuration, even if the slit were blocked by tilting of the float when in a state such that the float has approached the fluid level position of the minimum level of the suitable storage range of the operating fluid, communication between the float chamber and the rear side storage chamber may be secured through the operating fluid passage. Accordingly, a fluid level of a brake fluid in the float chamber is suitable, which enables the occurrence of fluctuations in the performance of the fluid level detection function to be advantageously prevented.

In addition, the operating fluid passage preferably has a groove shape. According to this configuration, the operating fluid passage may easily be formed on the inner face of the float guide.

In addition, the float guide, when mounted in a vehicle, preferably has a portion on a front side of the vehicle projecting upward beyond a portion on a rear side of the vehicle. According to this configuration, even in a situation in which the reservoir tank has tilted forward when the vehicle has tilted forward during braking, the portion on the front side of the vehicle is able to suppress overflow of the operating fluid and movement to the storage chamber. Accordingly, the occurrence of fluctuations in the performance of the fluid level detection function of the fluid level detection device may be advantageously prevented.

In addition, the slit and the operating fluid passage are preferably formed on the rear side of the vehicle, when mounted in the vehicle as viewed from the axial direction of the float guide and, with reference to a reference line in a longitudinal direction of the vehicle that passes through an axial center of the float guide, are preferably positioned so as to be biased in a circumferential direction of the float guide. According to this configuration, movement of the operating fluid from the float chamber to the rear side storage chamber may be suppressed not only when the reservoir tank is inclined toward the front of the vehicle, but also when the reservoir tank is inclined toward the rear of the vehicle due to sudden acceleration, or inclined toward the left and right of the vehicle due to turning. Accordingly, the fluid level of the operating fluid in the float chamber is suitable, which enables the occurrence of fluctuations in the performance of the fluid level detection function to be advantageously prevented.

In addition, when a pair of inner ribs are formed on the inner face of the float guide along two edges of the slit, the operating fluid passage may be partitioned by inner faces of the pair of inner ribs. According to this configuration, the operating fluid passage may easily be formed using the inner face of the float guide.

In addition, a brake device for a vehicle provided with the reservoir tank of the present application is preferably provided with a master cylinder device that receives a supply of the operating fluid from the reservoir tank. According to this brake device for a vehicle, even when the slit is blocked by tilting of the float, the float chamber and the storage chamber are in communication through the operating fluid passage, which is continuous with the slit. Passage of the operating fluid is thereby secured. Accordingly, the fluid level of the operating fluid in the float chamber is suitable, which enables a brake device to be obtained in which the occurrence of fluctuations in the performance of the fluid level detection function are advantageously prevented.

Advantageous Effects

According to the present invention, a reservoir tank and a brake device for a vehicle are obtained that enable the passage of operating fluid in the float chamber and the storage chamber to be secured even when the float has tilted to the slit side, and that suitably prevent the occurrence of fluctuations in the performance of the fluid level detection function of the reservoir tank.

DETAILED DESCRIPTION

Embodiments of the present invention are described in detail below, with reference to the accompanying drawings. It should be noted that, in the descriptions, identical reference signs are used for identical elements, and redundant descriptions are omitted. In addition, in the following descriptions, the terms "front," "back," "up," and "down" are used with reference to the directions indicated in FIG. 1, etc., and the terms "left" and "right" are used with reference to the directions indicated in FIG. 4.

(Embodiment 1)

FIG. 1 to FIG. 4 depict a reservoir tank 1 according to a first embodiment of the present teachings. In the following, a reservoir tank 1 that is connected to a master cylinder device that makes up a brake device for a vehicle is described. However, no limitation is intended to the device that is connected to the reservoir tank 1. It should be noted that the detailed configuration of the master cylinder device is described later.

Figure 1:
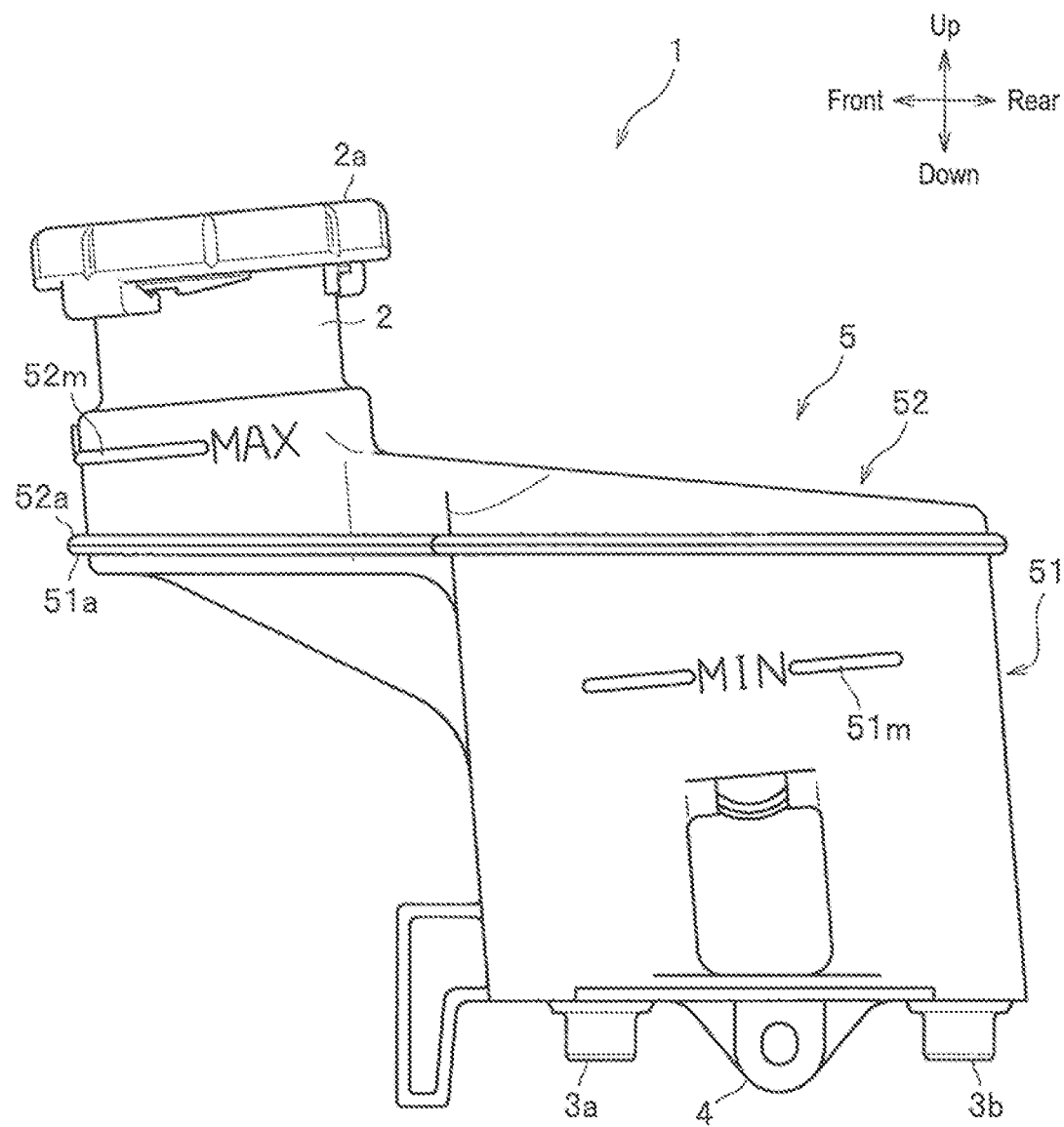
FIG. 1 is a left-hand side view of a reservoir tank in accordance with a first embodiment of the present invention.

As depicted in FIG. 1, the reservoir tank 1 is provided with a reservoir body 5, which is provided with an operating fluid intake port 2, and operating fluid supply ports 3a, 3b. The operating fluid intake port 2 is provided in an upper part of the reservoir body 5, and is closed by a cap 2a. A brake fluid that serves as the operating fluid is poured into the reservoir body 5 through the operating fluid intake port 2. The operating fluid supply ports 3a, 3b are provided at the front and back of the lower face of the reservoir body 5, with separation there between. As described below, the operating fluid supply ports 3a, 3b are configured so as to be respectively connected to the master cylinder device.

Figure 3:
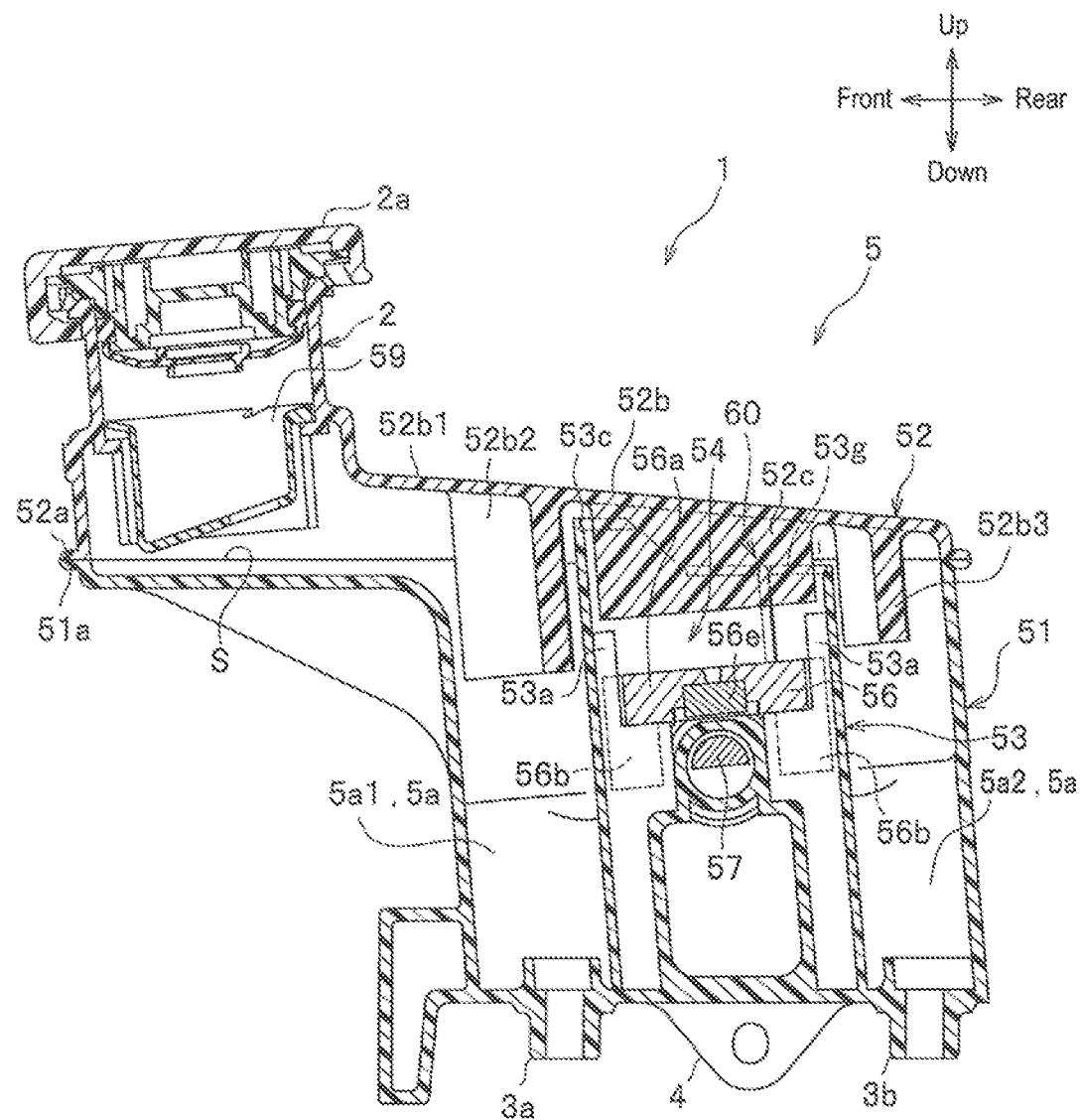
FIG. 3 is a vertical cross-sectional view of the reservoir tank.
Figure 4:
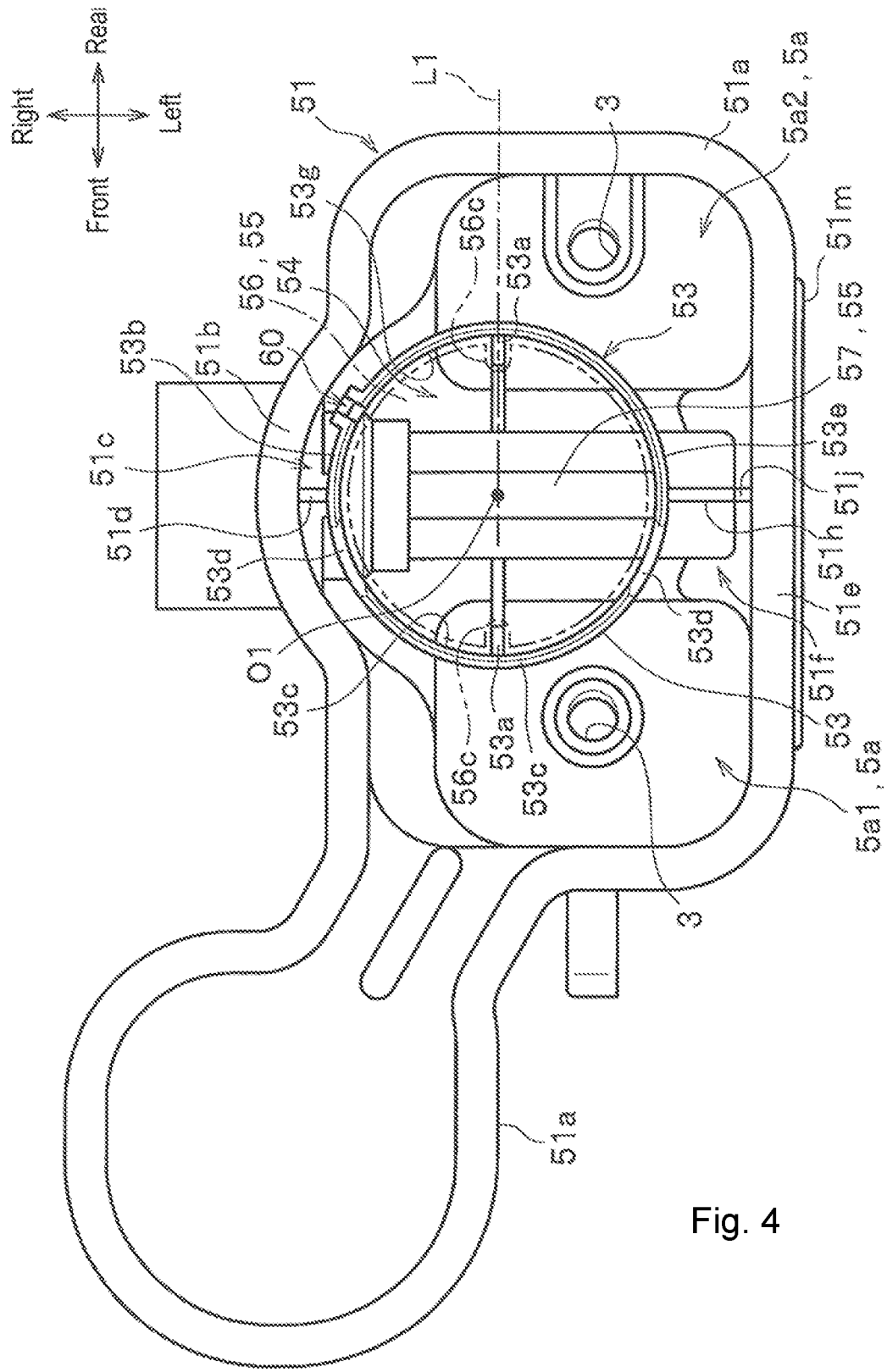
FIG. 4 is a plan view depicting a lower hemisphere of the reservoir tank.

The reservoir body 5 is made of resin. As depicted FIG. 1 to FIG. 3, the reservoir body 5 is made up a lower hemisphere 51 and an upper hemisphere 52. The interior of the reservoir body 5 is a storage chamber 5a that stores the brake fluid. As depicted in FIG. 1, the lower hemisphere 51 and the upper hemisphere 52 adhere to each other in a liquid-tight manner, through heat welding at a joining surface S of respective flanges 51a, 52a that are formed at opposing edges (see FIG. 3). The inner face of the lower hemisphere 51 and the inner face of the upper hemisphere 52 are continuous in the vertical direction. As depicted in FIG. 4, a front side storage chamber 5a1 is formed on the frontal side of the inside of the lower hemisphere 51, and a rear side storage chamber 5a2 is formed on the rearward side thereof.

Figure 5:
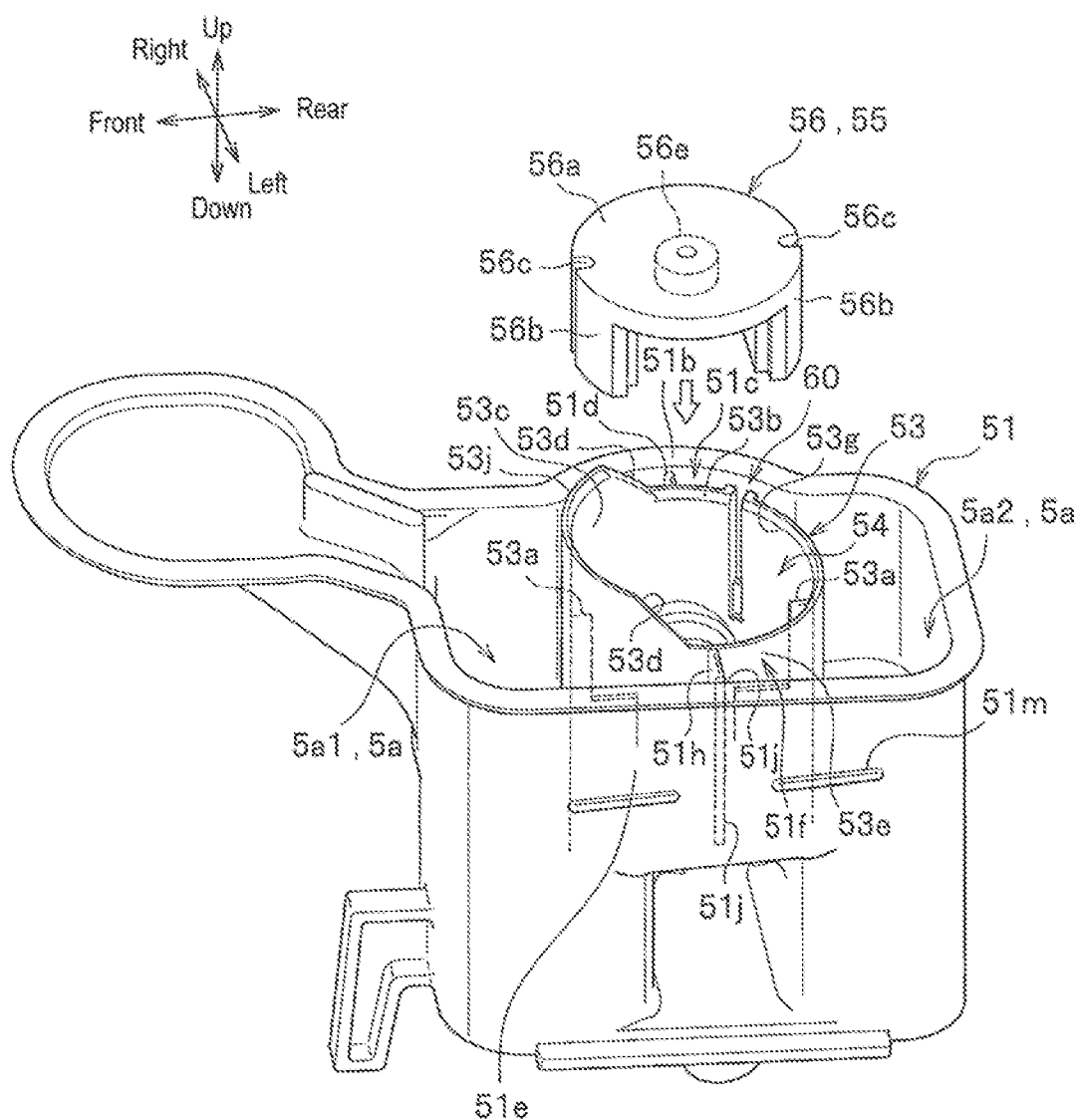
FIG. 5 is a perspective view depicting the lower hemisphere of the reservoir tank with a float removed.

As depicted in FIG. 5, a float guide 53 that is approximately cylindrical is mounted upright in the approximate center of the lower hemisphere 51. As depicted in FIG. 4, an axial center O1 of the float guide 53 is more biased toward the right-hand side than a central part of the reservoir body 5 in the lateral direction. A right-hand wall part 51b of the lower hemisphere 51 is correspondingly shaped so as to bulge outward toward the right-hand side. A right-hand gap 51c, which is arc-shaped as seen in a plan view, is formed between the right-hand wall part 51b of the lower hemisphere 51 and the right-hand wall part 53b of the float guide 53. The right-hand gap 51c is partitioned into front and rear by a right-hand partition wall 51d. The right-hand gap 51c is formed in the lateral direction across the space between the right-hand wall part 51b of the lower hemisphere 51 and the right-hand wall part 53b of the float guide 53. Accordingly, the right-hand gap 51c, which is closer to the front side than the right-hand partition wall 51d, is in communication with the front-side storage chamber 5a1. Likewise, the right-hand gap 51c, which is closer to the rear side than the right-hand partition wall 51d, is in communication with the rear-side storage chamber 5a2.

A left-hand gap 51f is formed between a left-hand wall part 51e of the lower hemisphere 51 and the left-hand wall part 53e of the float guide 53. The left-hand gap 51f is wider in the lateral direction than the right-hand gap 51c. A left-hand partition wall 51h that extends leftward from the left-hand wall part 53e of the float guide 53 toward the left-hand wall part 51e of the lower hemisphere 51 is provided in the left-hand gap 51f. A left-hand end of the left-hand partition wall 51h is not continuous with the left-hand wall part 51e of the lower hemisphere 51. A gap 51j is formed with respect to the left-hand wall part 51e. Accordingly, the brake fluid moves between the front side storage chamber 5a1 and the rear side storage chamber 5a2 through this gap 51j.

A float chamber 54 is formed on the inner side of the float guide 53. A fluid level detection device 55 is installed in the float chamber 54. The fluid level detection device 55 detects whether the brake fluid in the reservoir body 5 has approached a minimum level of a suitable storage range (brake fluid amount error in reservoir body 5). The fluid level detection device 55 is provided with a float 56 and a detector 57.

The float 56 is made from a lightweight material such as a foaming resin material. As depicted in FIG. 5, the float 56 is provided with a base part 56a that is disc shaped, and guide parts 56b that are each provided integrally and mounted vertically on front and rear lower parts of the base part 56a. Engagement grooves 56c each having a U-shaped cross-section are respectively formed in a front edge part and a rear edge part of the float 56, from the base part 56a across to the corresponding guide part 56b. The engagement grooves 56c engage with guide ribs 53a that are respectively formed on the front part and the rear part of the inner face of the float guide 53 (see FIG. 5). The float 56 floats (moves up and down) in accordance with fluctuations in the fluid level of the brake fluid in the float chamber 54. A magnet 56e, which is round, is attached to a lower central part of the base part 56a of the float 56.

The detector 57 detects whether the float 56 has moved below a defined position, and is provided with a reed switch (not illustrated) that is operated by the magnet 56e of the float 56. The reed switch is configured so as to operate when the float 56 has approached a fluid surface position 51m (see FIG. 5) at the minimum level of the suitable storage range of the brake fluid. A brake fluid amount error in the reservoir tank 1 is detected by the reed switch.

Figure 6:
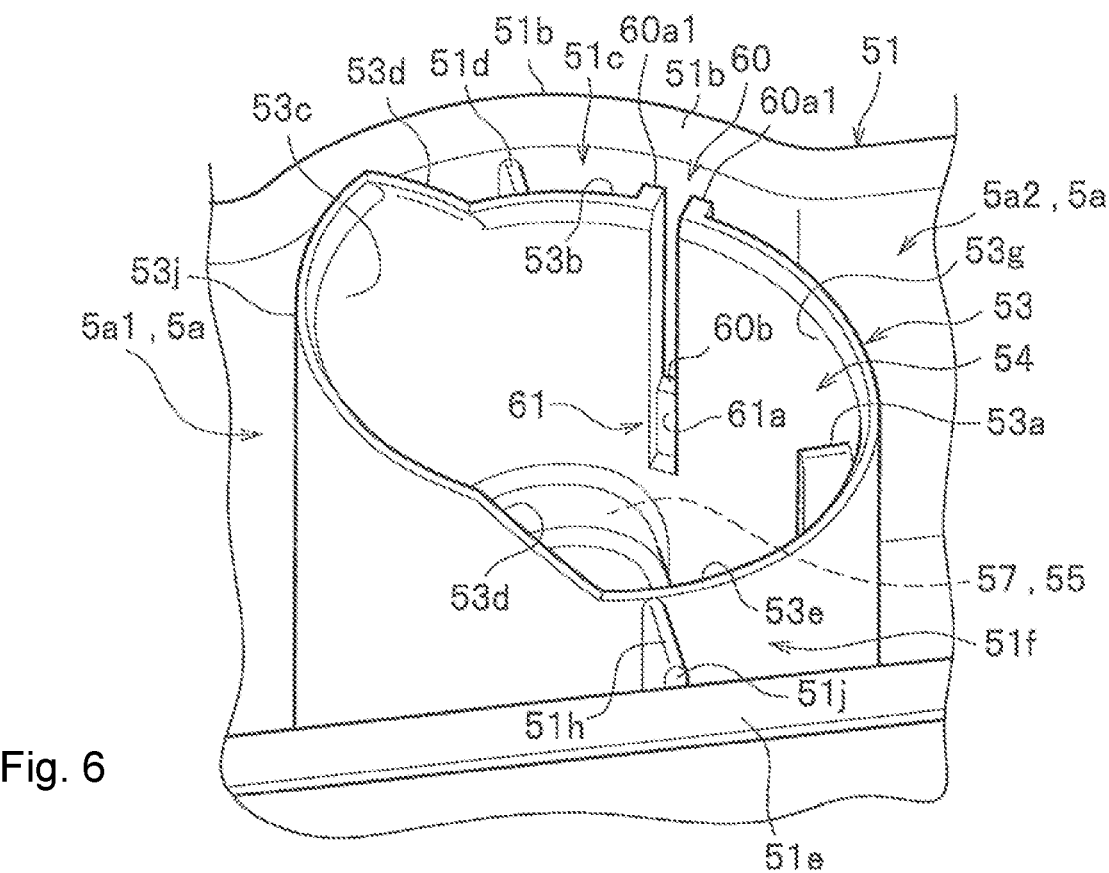
FIG. 6 is an enlarged perspective view depicting key portions of a float guide of the reservoir tank.

As depicted in FIG. 6, a slit 60 and an operating fluid passage or operating fluid channel 61 that is in communication with the slit 60 are each formed in a rear right-hand wall part of the float guide 53. The slit 60 and the operating fluid passage 61 are formed on the vehicle rear side, as seen from the axial direction of the float guide 53 when mounted on a vehicle, and, with reference to a reference line L1 (see FIG. 4) in the longitudinal direction of the vehicle that passes through the axial center O1 of the float guide 53, are biased toward the right-hand side in the circumferential direction of the float guide 53.

The slit 60 is a vertical notch that passes through the rear right-hand wall part of the float guide 53, through which the float chamber 54 and the rear-side storage chamber 5a2 are in communication. Within the float chamber 54, the brake fluid flows to the rear-side storage chamber 5a2 through the slit 60. As depicted in FIG. 5 and FIG. 6, the slit 60 is provided on the upper side of the float guide 53 when mounted on a vehicle, and extends from an upper edge part of the float guide 53 to the lower side in the axial direction of the float guide 53. In the axial direction of the float guide 53, the position of a bottom face 60b of the slit 60 is substantially the same position as the fluid level position 51m of the minimum level of the suitable storage range of the brake fluid (see FIG. 5, MIN level). That is, at least an amount of brake fluid corresponding to the fluid surface position 51m of the minimum level is secured in the float chamber 54.

Figure 7:
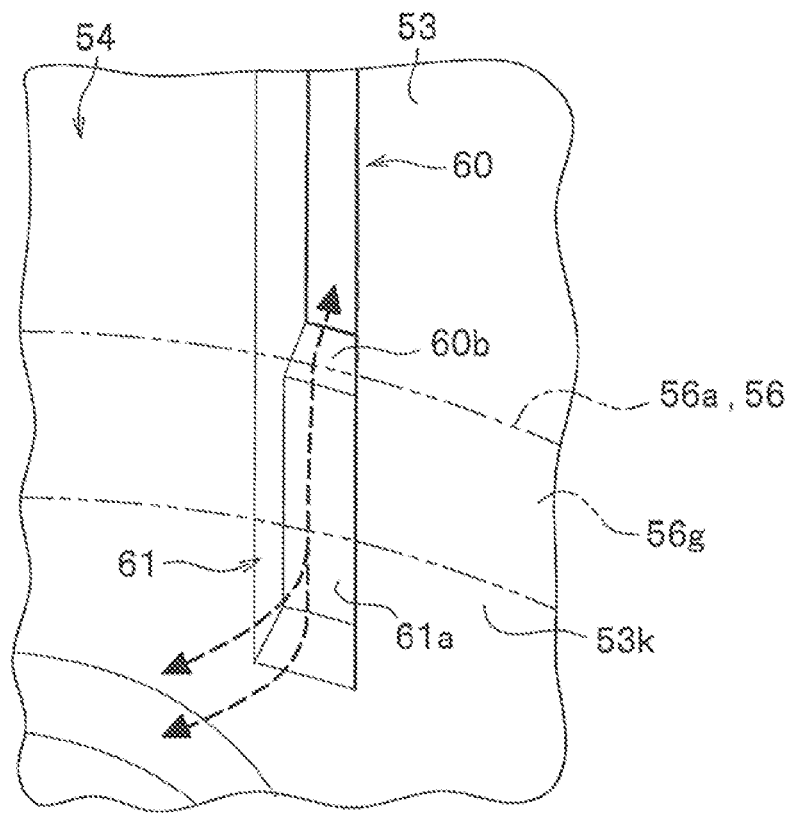
FIG. 7 is an enlarged perspective view depicting a slit and an operating fluid passage.
Figure 8:
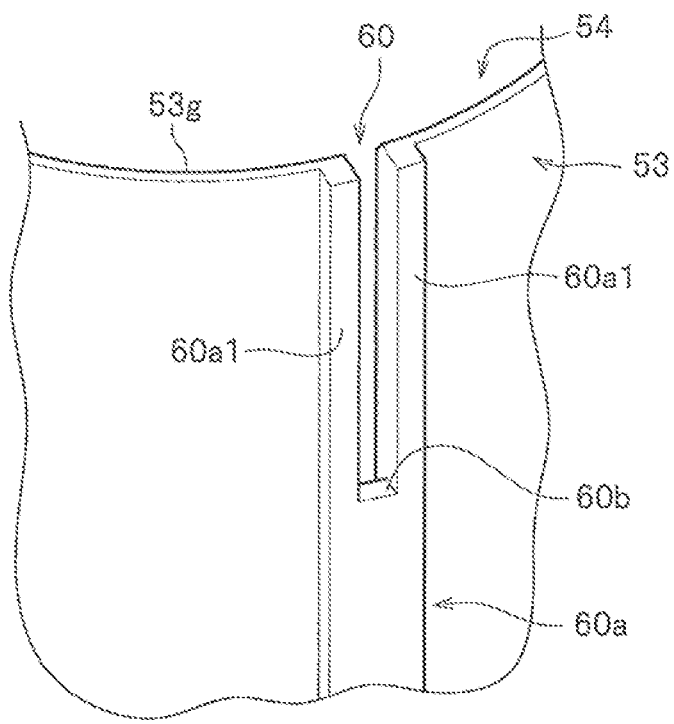
FIG. 8 is an enlarged perspective view of the slit and ribs, as viewed from the rear.

As depicted in FIG. 6 to FIG. 8, a vertical rib 60a is formed integrally and projects from the outer surface of the float guide 53, in correspondence with the position where the slit 60 and the operating fluid passage 61 are formed. The rib 60a extends across the entire length of the float guide 53 in the axial direction, and has an upper part 60a1 that is bifurcated along left and right outer edge parts of the slit 60. Accordingly, the left and right edge parts of the slit 60 are reinforced.

Figure 10:
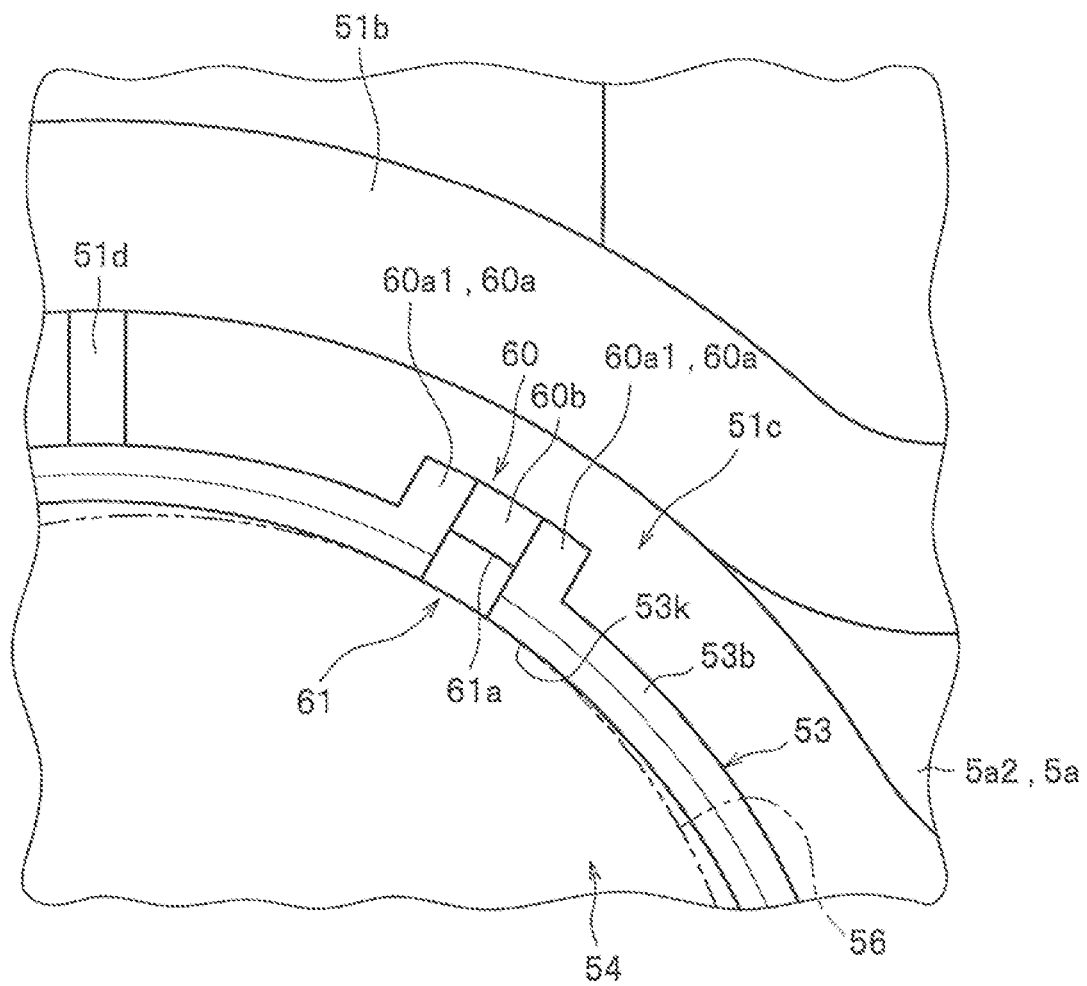
FIG. 10 is an enlarged plan view depicting the slit and the operating fluid passage.

As depicted in FIG. 6 and FIG. 10, the slit 60 extends backward to the right due to the rib 60a, and is open on the rear side to the right-hand gap 51c. Accordingly, the brake fluid is able to flow between the float chamber 54 and the rear side of the right-hand gap 51c, through the slit 60. Here, the right-hand gap 51c is narrow in comparison to the left-hand gap 51f. As such, the amount of the brake fluid that moves may be constrained in comparison to a situation where the slit 60 is provided on the wider left-hand gap 51f side.

When the brake fluid is poured into the reservoir tank 1, the brake fluid that has been poured through the operating fluid intake port 2 to the rear side storage chamber 5a2 flows to the right-hand gap 51c on the rear side, and is able to flow from the right-hand gap 51c to the float chamber 54 through the slit 60.

Figure 9:
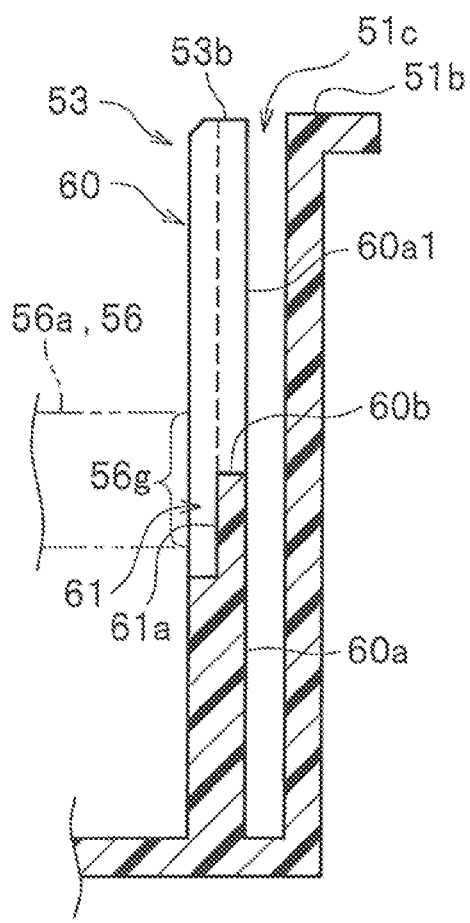
FIG. 9 is an enlarged cross-sectional view depicting the slit and the operating fluid passage.

The operating fluid passage 61 is a channel for the brake fluid that is formed in a vertical groove shape. The operating fluid passage 61 is provided as a concavity in the inner face of the float guide 53 so as to be continuous with the lower end part of the slit 60, and is formed in a linear shape extending downward from the lower end of the slit 60. As depicted in FIG. 9 and FIG. 10, a bottom face 61a of the operating fluid passage 61 is positioned closer to the outer side in the radial direction than the position of the inner face 53k of the float guide (offset toward the outer side in the radial direction). As depicted in FIG. 10, in the present embodiment, the bottom face 61a of the operating fluid passage 61 is positioned above an extension in the circumferential direction of the curved outer surface of the float guide 53. As depicted in FIG. 7, a lower part of the operating fluid passage 61 is formed so as to be extended (exposed) in a region that is lower than the float 56, while in a state such that the float 56 has dropped below the defined position where the detector 57 operates (state indicated by the double-chained line). Accordingly, the flow of the brake fluid through the operating fluid passage 61 and the slit 60 is secured, even in the state such that the float 56 has dropped below the defined position where the detector operates. That is, even if, hypothetically, the lower part of the slit 60 were to be blocked by the float 56 due to tilting of the float 56 toward the slit 60 side at the defined position where the detector 57 operates, the interior of the float chamber 54 and the slit 60 would be in communication via the operating fluid passage 61, and the brake fluid would be able to flow. Here, in FIG. 7, reference sign 56g indicates a region of blockage due to the float 56, and the dashed-line arrows indicate the flow of the brake fluid from the operating fluid passage 61 to the slit 60. In the present embodiment, only a base part 56a of the float 56 has a positional relationship that corresponds to the slit 60. For this reason, the region 56g that is blocked by the float 56 has a thickness corresponding to the base part 56a. However, depending on the formation position of the slit 60, in some cases, the base part 56a and a guide part 56b of the float 56 may both have a positional relationship that corresponds to the slit 60. In such a case, the region 56g that is blocked corresponds to the combined thickness of the base part 56a and the guide part 56b.

Figure 2:
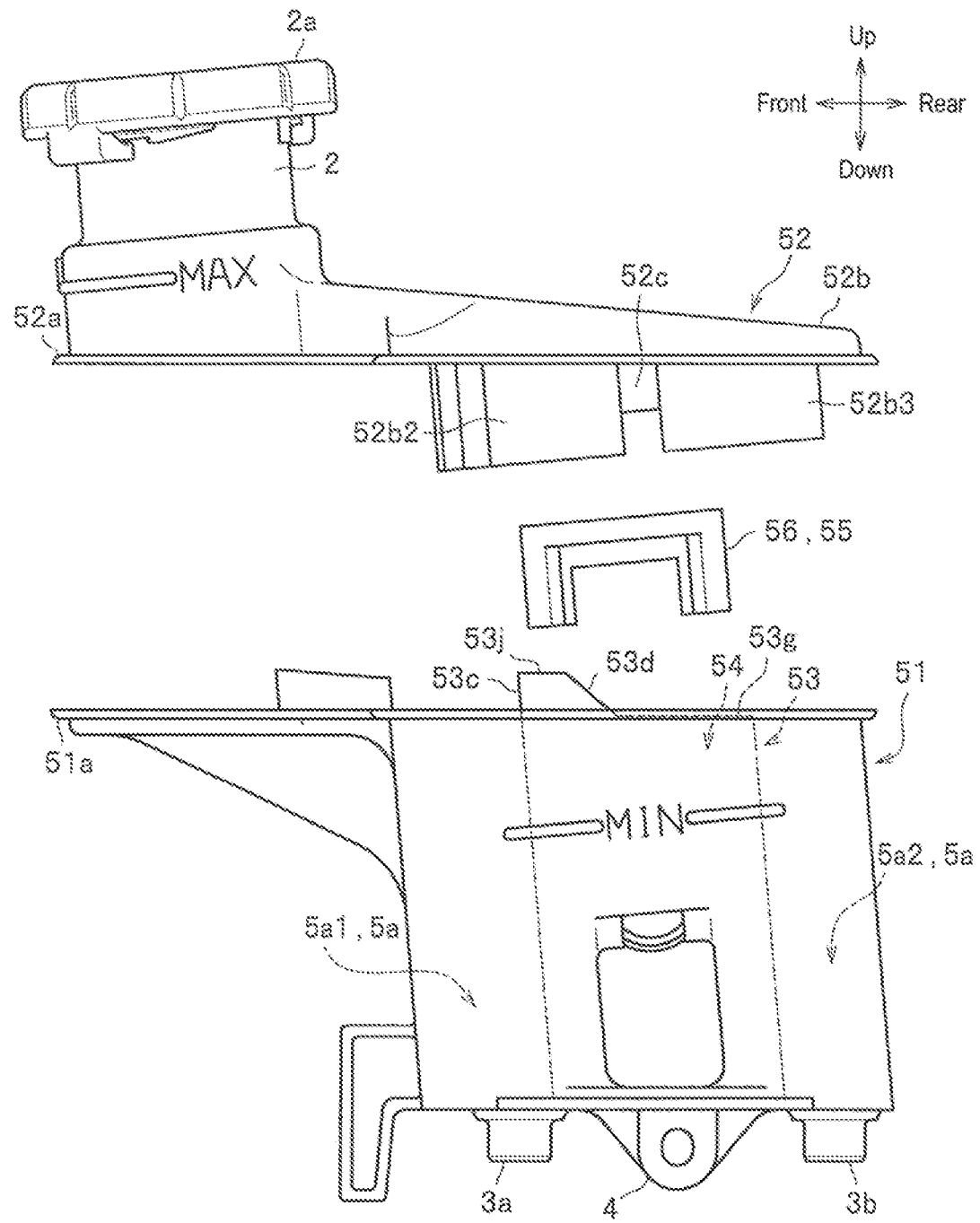
FIG. 2 is an exploded left-hand side view of the reservoir tank.

As depicted in FIG. 6, in the float guide 53, the front part 53c, which is on the front side of the vehicle when mounted on the vehicle, projects upward beyond the rear part 53g, which is on the rear side of the vehicle when mounted on the vehicle. As depicted in FIG. 2, the front part 53c extends upward beyond the flange 51a of the lower hemisphere 51, and as depicted in FIG. 3, enters into the inner side of the upper hemisphere 52. As depicted in FIG. 5, the front part 53c is provided with left and right ridge line parts 53d that are each inclined with respect to an upper edge part of the float guide 53, and with a flat ridge line part 53$_f$ that is continuous with the left and right ridge line parts 53d. The inclination angle of each of the left and right ridge line parts 53d is set so as to be approximately 45 degrees as seen in a side view. It should be noted that the angle of inclination may be set to any given value.

Figure 11:
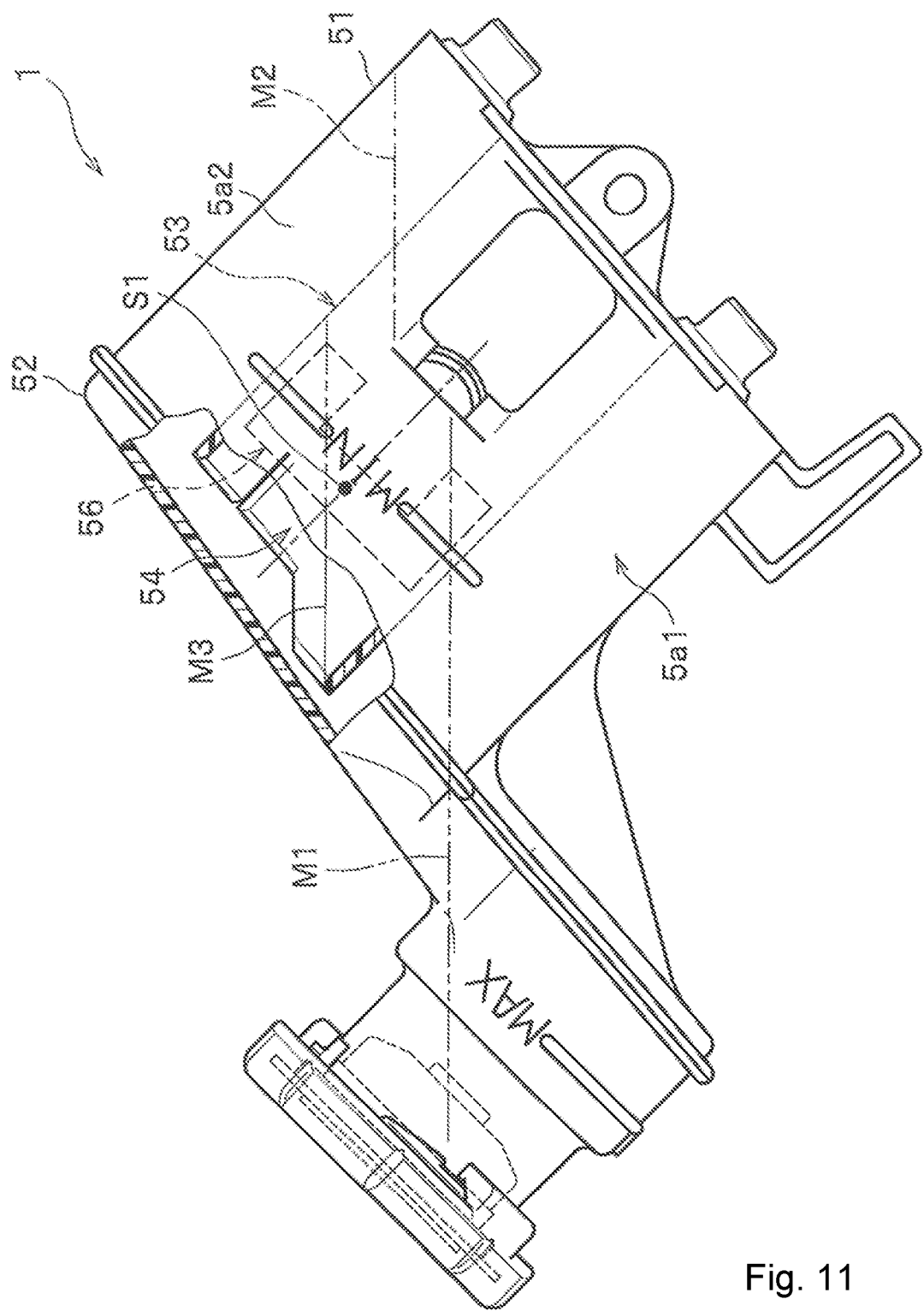
FIG. 11 is an explanatory diagram depicting the state of a fluid level when the reservoir tank is inclined forward.

FIG. 11 is an explanatory diagram that depicts the fluid level when the reservoir tank 1 is inclined forward. In FIG. 11, the fluid level M1 indicated by the double-chained line is the fluid level in the front side storage chamber 5a1 when inclined forward, and similarly, the fluid level M2 is the fluid level in the rear side storage chamber 5a2 when inclined forward. In addition, the fluid level M3 is the fluid level in the float chamber 54 when inclined forward, The front part 53c of the float guide 53 projects upward, as discussed above. Therefore, when the reservoir tank 1 is inclined forward and the fluid level M3 fluctuates, there is an effect of suppressing overflow of the brake fluid from the float chamber 54 toward the front.

Also, the inclined left and right ridge line parts 53d are present as left- and right-hand wall parts imitating the fluid level M3. When the reservoir tank 1 is inclined forward and the fluid level M3 fluctuates, there is an effect of suppressing overflow of the brake fluid from the float chamber 54 toward the left and right sides.

It should be noted that, in FIG. 11, reference sign S1 indicates the defined position where the detector 57 operates. The fluid level M3 is positioned higher than the defined position S1 due to the effect of the front part 53c. Accordingly, the float 56 does not move down to the defined position S1, and the detector 57 does not malfunction.

As depicted in FIG. 3, the upper hemisphere 52 is provided with the front side storage chamber 5a1, the rear side storage chamber 5a2, and a cover part 52b that covers the top of the float chamber 54. The cover part 52b is provided with an upper plate part 52b1, a front side hanging part 52b2, a rear side hanging part 52b3, and a middle hanging part 52c, provided integrally on the lower face of the upper plate part 52b1.

The upper plate part 52b1 is inclined gradually upward from the rear side to the front side, and does not have gradations on an inner face. A front end part of the upper plate part 52b1 is connected to the operating fluid intake port 2. Accordingly, when the brake fluid has been poured through the operating fluid intake port 2, air is easily able to move along the inner face of the upper plate part 52b1 from the rear side to the front side, and air removal is simplified.

A net-like filter 59 for capturing foreign matter is mounted on the lower inner side of the operating fluid intake port 2. As depicted in FIG. 1, a fluid level position 52m that is the maximum level of the suitable storage range of the brake fluid (MAX level) is configured at the lower portion of the operating fluid intake port 2.

As depicted in FIG. 2, the front side hanging part 52b2, the rear side hanging part 52b3, and the middle hanging part 52c project toward the bottom beyond the flange 52a. As depicted in FIG. 3, the front side hanging part 52b2 is inserted into an upper part of the front side storage chamber 5a1. This has an effect of adjusting the volume of the brake fluid in the front side storage chamber 5a1. In addition, the rear side hanging part 52b3 is inserted into the rear side storage chamber 5a2. This has the effect of adjusting the volume of the brake fluid in the rear side storage chamber 5a2. Accordingly, the front side storage chamber 5a1 and the rear side storage chamber 5a2 constrain the volume of the brake fluid that may be taken in. Also, the front side hanging part 52b2 and the rear side hanging part 52b3 have the effect of constraining wave formation in the brake fluid.

The middle hanging part 52c is inserted into the float chamber 54. The middle hanging part 52c is opposed to the base part 56a of the float 56, and regulates the floating of the float 56 beyond a necessary extent.

Figure 12:
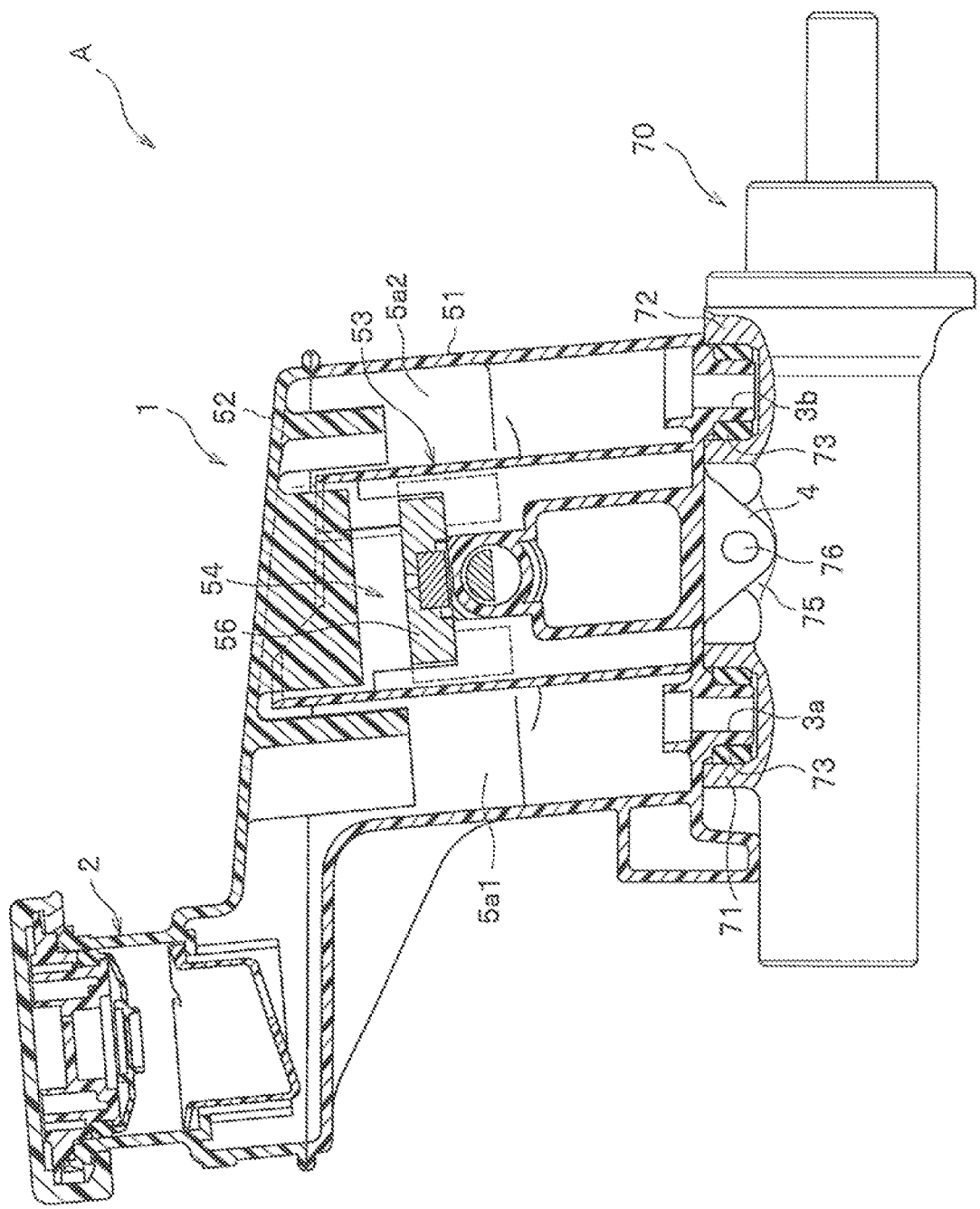
FIG. 12 is a partial cross-sectional side view depicting a brake device for a vehicle to which the reservoir tank is applied.
Figure 13:
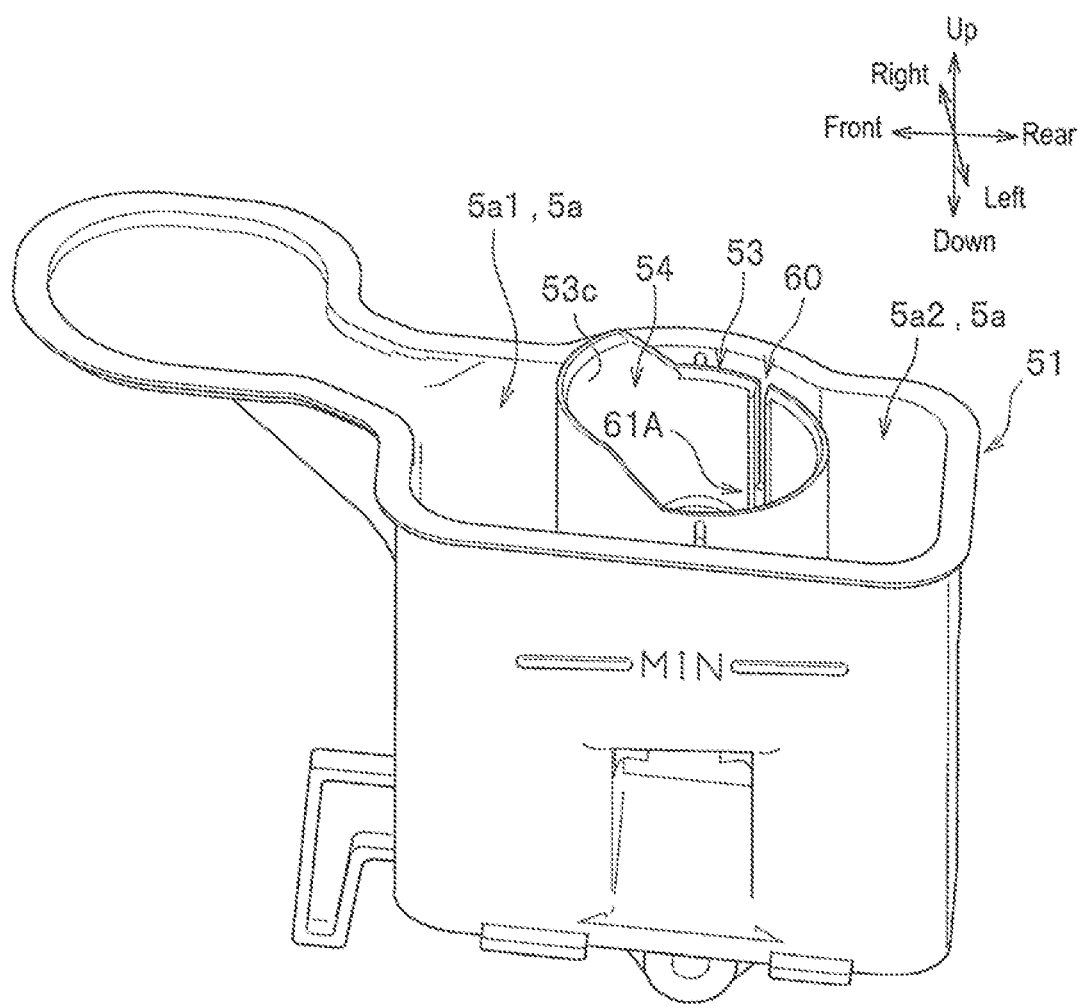
FIG. 13 is a perspective view depicting a lower hemisphere of a reservoir tank according to a second embodiment of the present invention.

Next, a brake device for a vehicle A to which the reservoir tank 1 of the present embodiment is applied is described with reference to FIG. 12.

The brake device for a vehicle A is provided with a tandem-type master cylinder device 70 that serves as a fluid pressure generation device. In response to an operation of a brake pedal (brake operator, not illustrated), the master cylinder device 70 converts a pedal force on the brake pedal into brake fluid pressure. The master cylinder device 70 is provided with two ports 71, 72 at the front and rear. The operating fluid supply ports 3a, 3b are mounted in the ports 71, 72 via seal members 73, 73. Two non-diagramed pressure chambers are provided inside the master cylinder device 70, at the front and rear, which are in communication with the ports 71, 72. A piston is stored in each of the pressure chambers. Each of the pistons receives the pedal force of the brake pedal, slides, and pressurizes the brake fluid in the respective pressure chamber. Each of the pressure chambers is in communication with a fluid pressure channel that is connected to a wheel brake (not illustrated).

A communication part 75 is formed in an upper part of the master cylinder device 70. An attachment leg part 4, provided on the lower face of the lower hemisphere 51 of the reservoir tank 1, is mounted on the communication part 75. The communication part 75 and the attachment leg part 4 are secured by a spring pin 76 that passes there through.

According to the above-described reservoir tank 1 of the present embodiment, in the float guide 53, even if, hypothetically, the slit 60 were to be blocked by the float 56 due to tilting of the float toward the slit 60, the interior of the float chamber 54 and the rear side storage chamber 5a2 would be in communication through the operating fluid passage 61, which is continuous with the slit 60, and passage of the brake fluid would be secured. Accordingly, the fluid level of the brake fluid in the float chamber 54 is suitable, which enables the occurrence of fluctuations in the performance of the fluid level detection function of the fluid level detection device 55 to be suitably prevented.

Also, the slit 60 is provided on the upper side of the float guide 53, and the operating fluid passage 61 is formed as a straight line that extends downward from the lower end of the slit 60. As such, the slit 60 and the operating fluid passage 61 may be formed integrally. Accordingly, a reservoir tank 1 is obtained that is superior in molding characteristics and in production characteristics.

In addition, the lower end position of the slit 60 corresponds to the fluid level position 51m of the minimum level of the suitable range of the brake fluid (MIN level). Therefore, the amount of brake fluid that moves from the float chamber 54 to the rear side storage chamber 5a2 may be constrained in comparison to a situation in which the slit 60 is formed as far as the bottom face of the float guide 53. As such, the amount of the brake fluid that is stored in the float chamber 54 may be secured. Accordingly, the fluid level of the brake fluid in the float chamber 54 is suitable, which enables the occurrence of fluctuations in the performance of the fluid level detection function of the fluid level detection device 55 to be suitably prevented.

In addition, the operating fluid passage 61 extends to a region that is lower than the float 56, when the float 56 has approached the fluid level position 51m of the minimum level of the suitable storage range of the brake fluid. Accordingly, even if the slit 60 were blocked by tilting of the float 56 when in a state such that the float 56 has approached the fluid level position 51m of the minimum level of the suitable storage range of the brake fluid, communication of the float chamber 54 and the rear side storage chamber 5a2 would be secured through the operating fluid passage 61. Accordingly, the fluid level of the brake fluid in the float chamber 54 is suitable, which enables the occurrence of fluctuations in the performance of the fluid level detection function of the fluid level detection device 55 to be suitably prevented.

In addition, the operating fluid passage 61 is shaped as a groove. As such, the operating fluid passage 61 is easily formed on the inner face of the float guide 53.

Also, the float guide 53 includes the front part 53c that projects upward. As such, even when the reservoir tank 1 is inclined forward due to the vehicle being inclined forward during braking, spilling of the brake fluid from the front part 53c of the float chamber 54 and displacement to the front side storage chamber 5a1 may be constrained. Accordingly, the occurrence of fluctuations in the performance of the fluid level detection function of the fluid level detection device 55 may be suitably prevented.

In addition, the slit 60 and the operating fluid passage 61 are disposed at a position that is biased in the circumferential direction of the float guide 53, with reference to the reference line L1, on the rear side of the vehicle. Accordingly, movement of the brake fluid from the float chamber 54 to the rear side storage chamber 5a2 may be constrained not only when the reservoir tank 1 is inclined toward the front of the vehicle, but also when the reservoir tank 1 is inclined toward the rear of the vehicle due to sudden acceleration, or inclined toward the left and right of the vehicle due to turning Also, the bottom face 61a of the operating fluid passage 61 is positioned closer to the outer side in the radial direction than the inner face 53k of the float guide 53. Therefore, the operating fluid passage 61 is easily formed using the wall parts of the float guide 53. In addition, the volume of the float guide 53 may be suitably secured. Accordingly, the occurrence of fluctuations in the performance of the fluid level detection function of the fluid level detection device 55 may be suitably prevented. Also, even when the wall parts of the float guide 53 have a thin structure, the operating fluid passage 61 is easily formed using a space (the right-hand gap 51c) on the outer side of the wall part of the float guide 53.

In addition, the brake device for a vehicle A is provided with the master cylinder device 70, which receives a supply of brake fluid from the reservoir tank 1. In this brake device for a vehicle A, even when the slit 60 is blocked by tilting of the float 56, the interior of the float chamber 54 and the rear side storage chamber 5a2 are in communication through the operating fluid passage 61, which is continuous with the slit 60. Passage of the brake device is thereby secured. Accordingly, the brake device for a vehicle A is obtained in which the fluid level of the brake fluid in the float chamber 54 is suitable, and the occurrence of fluctuations in the performance of the fluid level detection function of the fluid level detection device 55 may be suitably prevented.

(Embodiment 2)

A reservoir tank 1 in accordance with a second embodiment of the present teachings is described with particular reference to FIG. 13 to FIG. 16. The second embodiment 2 differs from first embodiment 1 in that a bottom face 53n of an operating fluid passage 61A is formed so as to be flush with the inner face 53k of the float guide 53.

Figure 14:
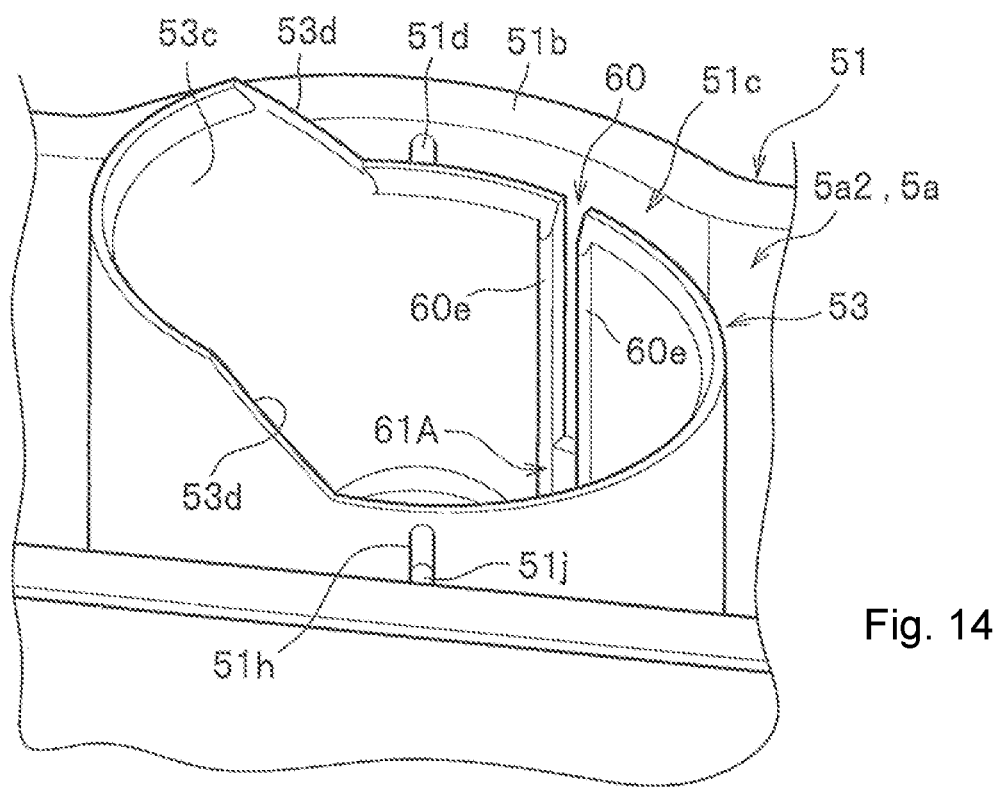
FIG. 14 is an enlarged perspective view of a slit and an operating fluid passage.
Figure 15:
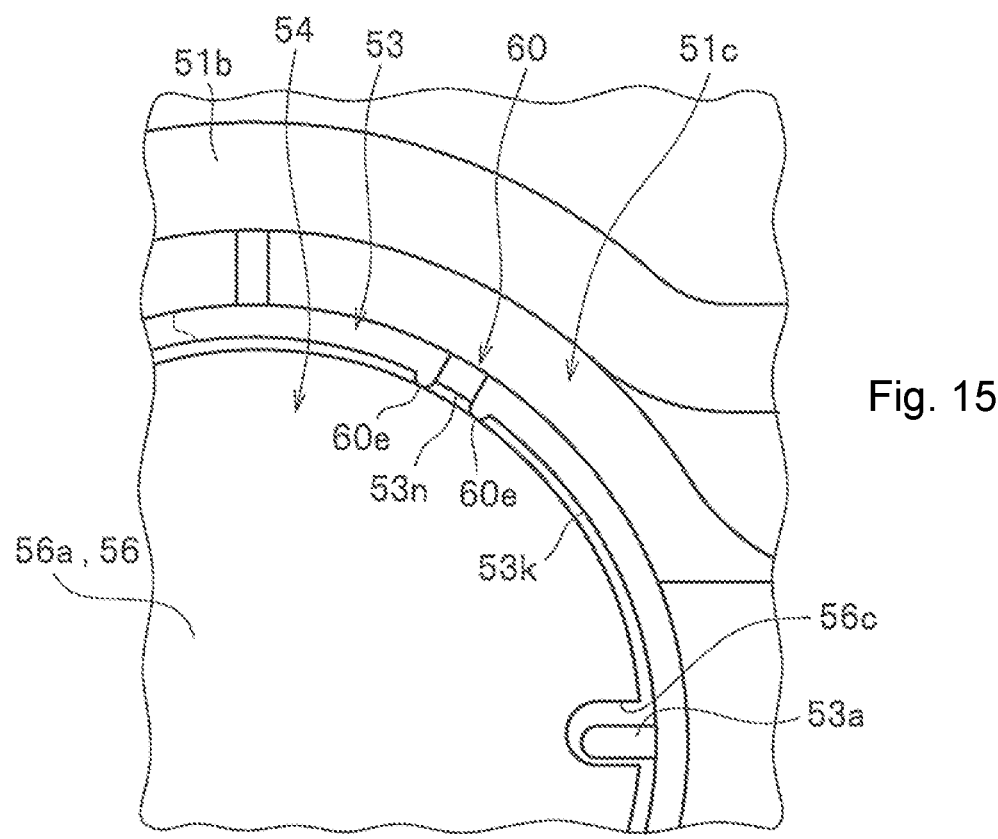
FIG. 15 is an enlarged plan view depicting the slit and the operating fluid passage.

Vertical inner ribs 60e are provided integrally so as to project from the inner face 53k of the float guide 53. The inner ribs 60e are formed along the left and right aperture edges of the slit 60. The inner ribs 60e are formed along the entire length of the float guide 53 in the axial direction. As depicted in FIG. 14 and FIG. 15, the slit 60 protrudes into the float chamber 54 due to the inner ribs 60e. It should be noted that the left and right edge parts of the slit 60 are reinforced.

The operating fluid passage 61A is a channel for the brake fluid which is formed as a vertical groove, and is surrounded by inner faces 60e1 of the inner ribs 60e on the left and right, and by the bottom face 53n sandwiched there between. The bottom face 53n is continuous with the inner face 53k of the float guide 53 in the circumferential direction, and is substantially flush with the inner face 53k. The operating fluid passage 61A is formed so as to be continuous with the bottom end part of the slit 60, and has a linear shape that extends downward from the bottom end of the slit 60.

Figure 16:
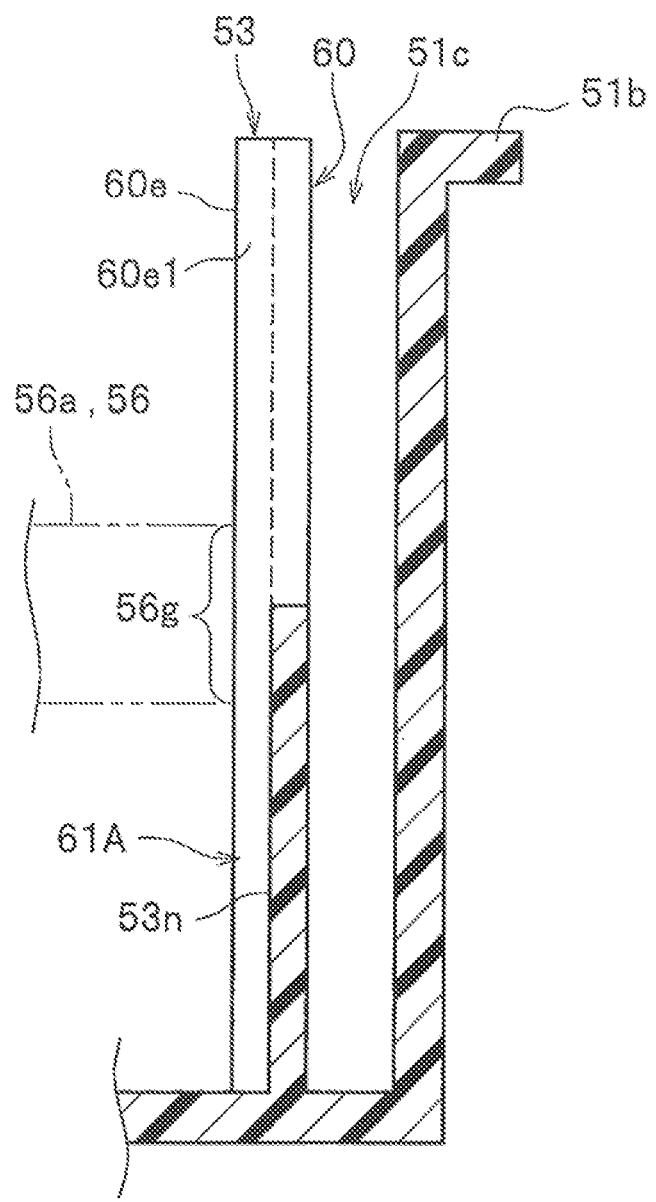
FIG. 16 is an enlarged cross-sectional view depicting the slit and the operating fluid passage.

As depicted in FIG. 16, a lower part of the operating fluid passage 61 is extended (exposed) in a region that is lower than the float 56, while in a state such that the float 56 has fallen below the defined position where the detector 57 (see FIG. 3) operates (state indicated in the drawings by the double-chained line. Accordingly, the flow of the brake fluid through the operating fluid passage 61A and the slit 60 is secured, even in the state such that the float 56 has fallen below the defined position where the detector 57 operates.

That is, even if, hypothetically, the lower part of the slit 60 were to be blocked by the float 56 due to tilting of the float 56 toward the slit 60 side at the defined position where the detector 57 operates, the interior of the float chamber 54 and the slit 60 would be in communication via the operating fluid passage 61A, and the brake fluid would be able to pass. Here, in FIG. 16, reference sign 56g indicates a region of blockage due to the float 56. In the present embodiment, only a base part 56a of the float 56 has a positional relationship that corresponds to the slit 60. For this reason, the region 56g that is blocked by the float 56 has a corresponding thickness to the base part 56a. However, depending on the formation position of the slit 60, in some cases, the base part 56a and a guide part 56b of the float 56 may both have a positional relationship that corresponds to the slit 60. In such a case, the region 56g that is blocked corresponds to the combined thickness of the base part 56a and the guide part 56b.

In the reservoir tank 1 of the present embodiment, the bottom face 53n of the operating fluid passage 61A is formed so as to be substantially flush with the inner face 53k of the float guide 53, and the inner ribs 60e are provided on the inner face 53k of the float guide 53. Thus, the operating fluid passage 61A is easily formed by using the inner face 53k of the float guide 53 as is.

The present invention has been described above on the basis of the embodiments. However, the present invention is not limited to the configurations of the described embodiments. Other suitable modifications are possible, within a range that does not exceed the spirit thereof.

For example, in embodiment 1, the slit 60 and the operating fluid passage 61 are indicated as being formed as straight lines along the axial center O1 of the float guide 53. However, no such limitation is intended, and the components may be inclined with respect to the axial center O1. The same applies to embodiment 2.

Also, in embodiment 1, the slit 60 and the operating fluid passage 61 are indicated as being disposed at positions that are biased toward the right-hand side in the circumferential direction of the float guide 53, with respect to a reference line L1. However, no such limitation is intended. The components may, for example, be disposed so as to biased toward the left-hand side in the circumferential direction of the float guide 53, which is the opposite side. The same applies to embodiment 2.

In addition, in embodiment 1 and in embodiment 2, the respective operating fluid passages 61, 61A are indicated as being groove shaped. However, no such limitation is intended, provided that the passage of the brake fluid in the slit 60 is secured. A configuration using a recess-shaped depression may also be used.

Also, the reservoir tank 1 may be held by a bracket of the vehicle (not illustrated), and may, for example, be supported by a side wall, etc., of the engine chamber. In addition, the reservoir tank may be secured to the bracket via an attachment flange, attachment rack, or the like (not illustrated).

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A reservoir tank comprising:
    a reservoir body defining a storage chamber for an operating fluid;
    a float guide in the storage chamber, the float guide forming a float chamber on an inner side; and
    a fluid level detection device having a float movable up and down in the float chamber on the inner side of the float guide in response to fluctuations of a fluid level, and having a detector detecting a position of the float,
    wherein the float guide includes:
        a slit extending through a wall of the float guide in a horizontal direction and communicating with the storage chamber and the float chamber and
        an operating fluid passage provided on an inner face of the float guide continuous with the slit, the operating fluid passage extending halfway through the wall of the float guide in the horizontal direction and communicating with the slit and the float chamber.

2. The reservoir tank according to claim 1, wherein the slit is provided on an upper side of the float guide, and the operating fluid passage is formed in a linear shape extending downward from a lower end of the slit.

3. The reservoir tank according to claim 2, wherein a depth of the operating fluid passage in the horizontal direction is smaller than that of the slit in the horizontal direction.

4. The reservoir tank according to claim 1, wherein
    the slit is formed from an upper edge part of the float guide toward a lower side in an axial direction of the float guide, and
    a lower end position of the slit corresponds to a fluid level position at a minimum level of a suitable storage range of the operating fluid.

5. The reservoir tank according to claim 1, wherein the operating fluid passage extends to a region below the float when the float has approached the fluid level position at the minimum level of the suitable storage range of the operating fluid.

6. The reservoir tank according to claim 1, wherein the operating fluid passage has a groove shape.

7. The reservoir tank according to claim 1, wherein the float guide, when mounted in a vehicle, has a portion on a front side of the vehicle projecting upward beyond a portion on a rear side of the vehicle.

8. The reservoir tank according to claim 1, wherein the slit and the operating fluid passage are formed on a rear side of a vehicle, when mounted in the vehicle as viewed from an axial direction of the float guide and, with reference to a reference line in a longitudinal direction of the vehicle that passes through an axial center of the float guide, are positioned so as to be biased in a circumferential direction of the float guide.

9. The reservoir tank of claim 8, in combination with the vehicle.

10. The reservoir tank of claim 1, in combination with a brake device for a vehicle, further comprising:
    a master cylinder device for receiving a supply of the operating fluid from the reservoir tank.

11. The reservoir tank according to claim 1, wherein a depth of the operating fluid passage in the horizontal direction is smaller than that of the slit in the horizontal direction.

12. The reservoir tank according to claim 1, wherein the operating fluid passage allows a flow of the operating fluid between the storage chamber and the float chamber irrespective of a position of the float.

13. A reservoir tank comprising:
    a reservoir body defining a storage chamber for an operating fluid;

a float guide in the storage chamber, the float guide forming a float chamber on an inner side; and a fluid level detection device having a float movable up and down in the float chamber on the inner side of the float guide in response to fluctuations of a fluid level, and having a detector detecting a position of the float, wherein the float guide includes a slit in communication with the storage chamber and the float chamber, and an operating fluid passage is provided on an inner face of the float guide that is continuous with the slit, and is in communication with the slit and the float chamber, wherein a pair of inner ribs are formed on the inner face of the float guide along two edges of the slit, and wherein the operating fluid passage is partitioned by inner faces of the pair of inner ribs.

* * * * *